United States Patent [19]

Okuwaki

[11] Patent Number: 5,315,405
[45] Date of Patent: May 24, 1994

[54] BINARY CIRCUIT OF SCANNER READ IMAGE DATA

[75] Inventor: Hirotaka Okuwaki, Tokyo, Japan

[73] Assignee: Mutoh Industries Ltd., Tokyo, Japan

[21] Appl. No.: 833,922

[22] Filed: Feb. 12, 1992

Related U.S. Application Data

[63] Continuation-in-part of Ser. No. 540,628, Jun. 19, 1990, abandoned.

[30] Foreign Application Priority Data

Aug. 29, 1989 [JP] Japan .................. 1-222621

[51] Int. Cl.$^5$ .............................. H04N 1/40
[52] U.S. Cl. .................. 358/445; 358/443; 358/465; 382/50; 382/53
[58] Field of Search ............... 358/443, 448, 455, 463, 358/465, 466; 382/50, 53

[56] References Cited

U.S. PATENT DOCUMENTS

| | | | |
|---|---|---|---|
| 3,973,239 | 8/1976 | Kakumoto et al. | 382/50 |
| 4,251,837 | 2/1981 | Janeway, III | 358/455 |
| 4,694,353 | 9/1987 | Sato et al. | 358/455 |
| 4,723,173 | 2/1988 | Tanioka | 358/465 |
| 4,996,602 | 2/1991 | Ono et al. | 358/455 |
| 5,109,436 | 4/1992 | Machida et al. | 358/462 |
| 5,159,471 | 10/1992 | Satou et al. | 358/466 |

OTHER PUBLICATIONS

IBM Technical Disclosure Bulletin, vol. 16 No. 4 Sep. 1973 pp. 1247-1248.

*Primary Examiner*—Richard E. Chilcot, Jr.
*Assistant Examiner*—Rafael Bacares
*Attorney, Agent, or Firm*—Wenderoth, Lind & Ponack

[57] ABSTRACT

A binarizing circuit is provided for converting an image signal generated by an image scanner into a binary signal. The image scanner scans an image and generates a corresponding image signal. The image signal has a signal magnitude which varies in accordance with the density of the scanned image. A first comparator compares the signal magnitude of the image signal with a first threshold, and a second comparator compares the signal magnitude of the image signal with a second threshold which is different than the first threshold. An output circuit generates a binary signal which is made up of first and second values which respectively denote a presence of the scanned image and an absence of the scanned image. The output circuit generates the first value of when the signal magnitude of the image signals is between the first and second thresholds, and the output circuit generates the second when the signal magnitude of the image signal is not between the first and second thresholds.

3 Claims, 3 Drawing Sheets

BINARY CIRCUIT OF SCANNER READ IMAGE DATA

CROSS REFERENCE TO RELATED APPLICATIONS

This application is a Continuation-In-Part of abandoned application Ser. No. 07/540,628, filed Jun. 19, 1990.

BACKGROUND OF THE INVENTION

1. Field of the Invention

This invention relates to a binarizing circuit of scanner read image signals.

2. Description of the Related Art

According to the prior art shown in FIG. 4, a scanner 2 reads an image 6 drawn on a paper sheet 4. In order to change the read analog image signals (multi-value voltages) obtained by a sensor reader 2a of the scanner 2 to binary data, a voltage threshold is set and each analog image signal is binarized using the voltage threshold as a boundary. As shown in FIG. 5, a single threshold value T is used in the conventional technology.

As also shown in FIG. 5, if the density of dirt and dust present on the sheet 4 is darker than that of the image 6 (line) to be read, the dirt and dust may also be read, thus producing erroneous results.

More specifically, as shown in FIG. 4, the sensor reader 2a is made up of a plurality of sensors arranged in a line direction. Referring to FIG. 4, assume that one of the plurality of sensors (i.e. sensor 40) detects the presence of the line 6 on the sheet 4 and another of the plurality of sensors (i.e. sensor 100) detects the presence of dust on the sheet 4. The remaining sensor elements detect neither the line 6 nor dirt or dust. As shown in FIG. 5, the output from the sensor element 40 will fall below the threshold T due to the presence of the line 6. Also, the output of the sensor element 100 will fall below the threshold T due to the presence of dust on the paper 4. Thus, the binarized output for the sensor elements 40 and 100 will be zero (BLACK) whereas the binarized output of the remaining sensor elements will be one (WHITE). Thus, since the binarized output for the sensor 100 is zero (denoting "black"), an error in the read operation is created.

It is a purpose of the present invention to provide a binarizing circuit of scanner read images signals which overcomes the shortcomings of the conventional technology.

DESCRIPTION OF THE PREFERRED EMBODIMENT

The construction and principle of the binarizing circuit according to the present invention will be described with reference to the accompanying drawings.

Figure 1:
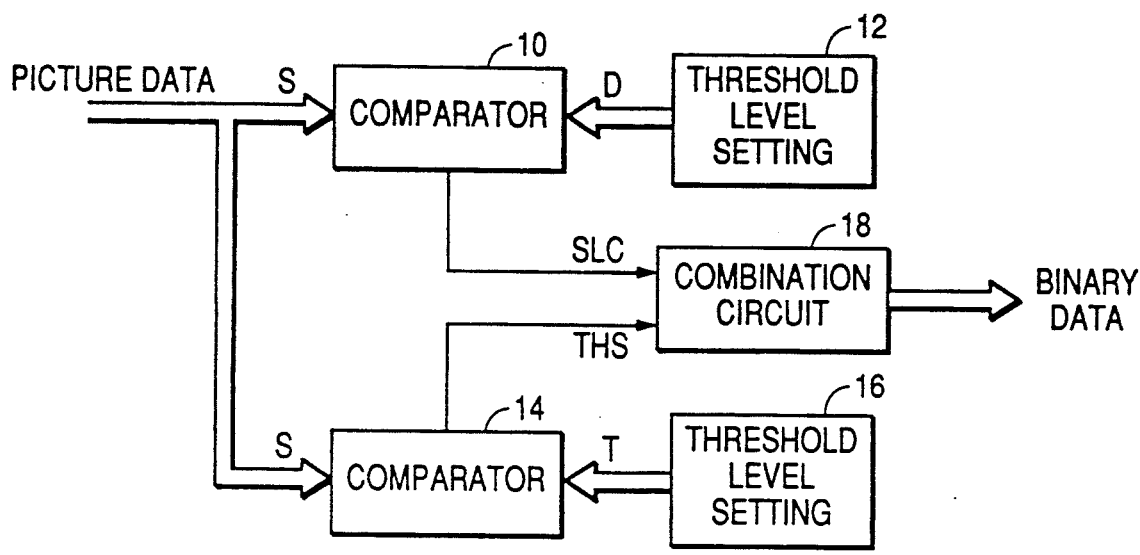
FIG. 1 is a block diagram of the binarizing circuit of the scanner read image signals according to the present invention.

Referring to FIG. 1, an input terminal of the first comparator 10 is connected to an output terminal of the sensor reader 2a of the scanner. The read image signal (multi-value voltage) S read by the sensor reader 2a is supplied to the input terminal of the first comparator 10. To another input of the first comparator 10, an output terminal of a first threshold level setting circuit 12 is connected. The threshold level setting circuit 12 supplies a first threshold set value D to the other input terminal of the comparator 10. One input terminal of a second comparator 14 is connected to the output terminal of the scanner sensor reader 2a and another input terminal of the second comparator 14 is connected to an output terminal of second threshold level setting circuit 16. To the other input terminal of the second comparator 14, the second threshold level setting circuit 16 supplies the second threshold set value T. The thresholds set can be changed arbitrarily. Output terminals of the first and second comparators 10 and 14 are connected to the input terminals SLC and THS of the combining circuit 18.

The operation of the embodiment of the binarizing circuit of the present invention will now be explained.

The image signal S generated by the sensor reader 2a of the scanner is supplied to respective input terminals of the comparators 10 and 14. The image signal S is made up of, for example, a series of successive voltage levels respectively and sequentially output from the sensor elements of the line sensor reader 2a. That is, the image signal S is made up of a series of sensor element voltage signals respectively associated with the sensor elements of the line sensor reader 2a.

Figure 2:
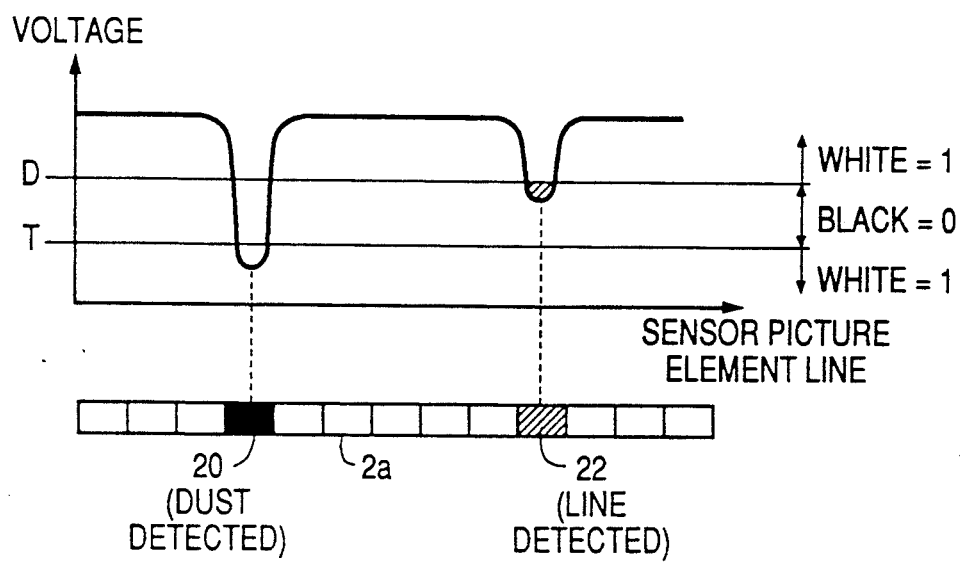
FIG. 2 is an explanatory view of the outputs of the binarizing circuit according to the present invention.

It is apparent from FIG. 2 that the first threshold D and the second threshold T, respectively, set in the comparators 10 and 14 denote different voltage levels. When the level of a sensor element voltage signal of the input image signal S is identical with the first threshold D or higher than the first threshold ($D<S$ or $D\leq S$), the first comparator 10 outputs "1." When the level of the sensor element voltage signal of the input image signal S is lower than the first threshold D ($D>S$), "0" is output from the first comparator 10. Similarly, when the level of the sensor element voltage signal of the input image signal S is identical with or higher than the second threshold T ($T<S$ or $T\leq S$), the second comparator 14 outputs "1." The second comparator 14 outputs "0" when $T>S$.

As can be seen from FIG. 2, the combining circuit 18 is set to output "1" (WHITE) when the input terminals SLC and THS both equal 1 or both equal 0 (zero). In the case where SLC=0 and THS=1, the combining circuit 18 outputs "0" (BLACK).

In this manner, the analog sensor image signal S (comprising a series of successive multi-value sensor element voltage signals respectfully associated with the sensor elements of the line sensor reader 2a) is converted into binary data (comprising a series of successive 1's and 0's respectively associated with the sensor elements of the line sensor reader 2a).

As a result, referring to FIG. 2, when a sensor element 20 detects dust having a density which is higher than that of the image line detected by the sensor element 22 formed on the manuscript, resulting in a voltage level outputted from the sensor element 20 which is lower than the level of the threshold T, the outputs of the comparators 10 and 14 with respect to the sensor element 20 are both made equal to "0" and thus the combining circuit 18 outputs "1" (WHITE). Thus, dirt and dust particles having a density which is higher than that of the image line are not recognized as "black" points by the combining circuit 18 and are instead denoted as "1" or "white" points.

Figure 3:
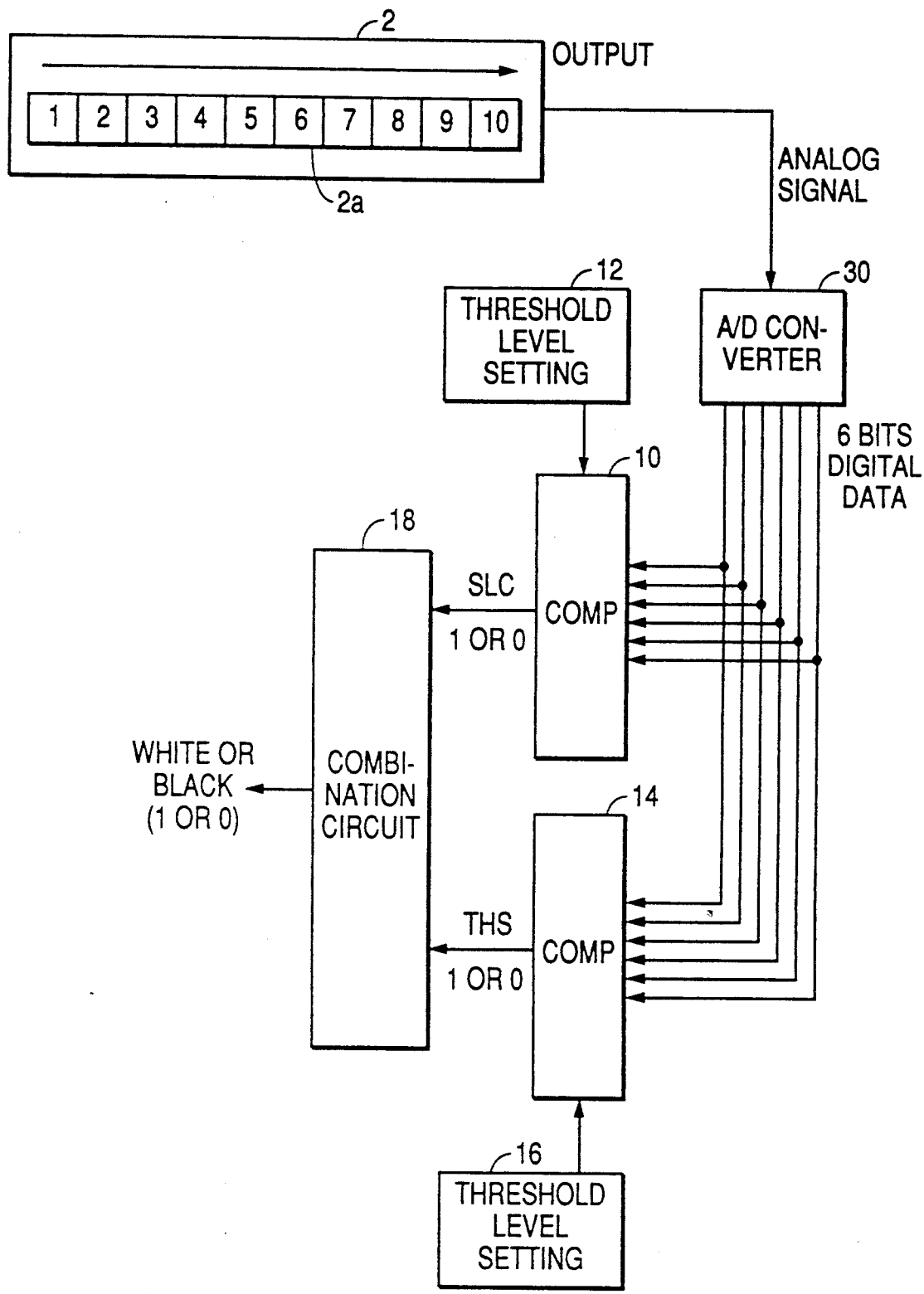
FIG. 3 is a more detailed block diagram of the image signal binarizing circuit of the present invention.
Figure 4:
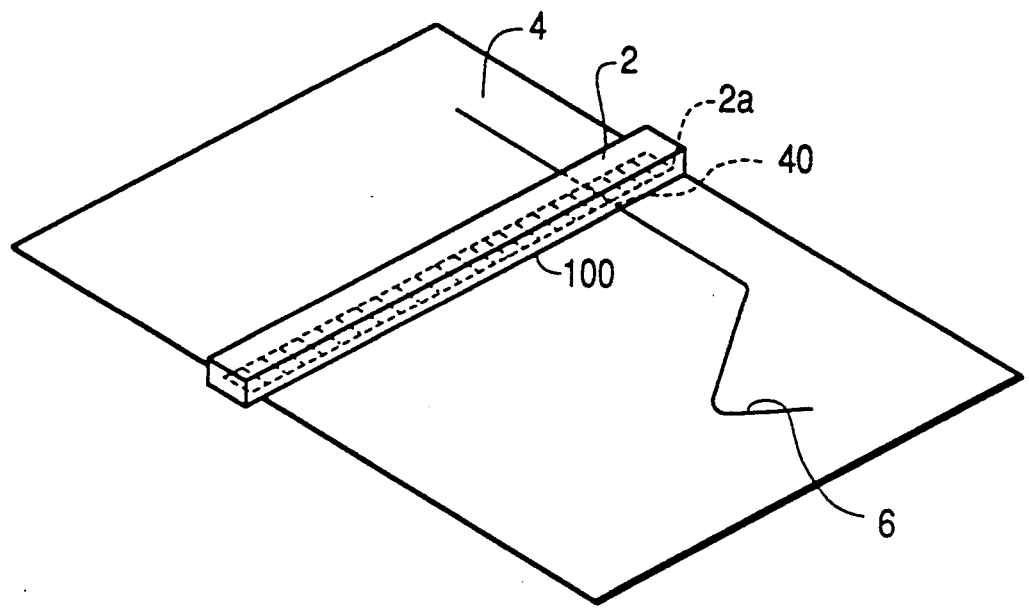
FIG. 4 is a perspective of the conventional technology.

FIG. 3 depicts an embodiment in which the input image signal S is first digitized before being applied to the comparators 10 and 14.

Figure 5:
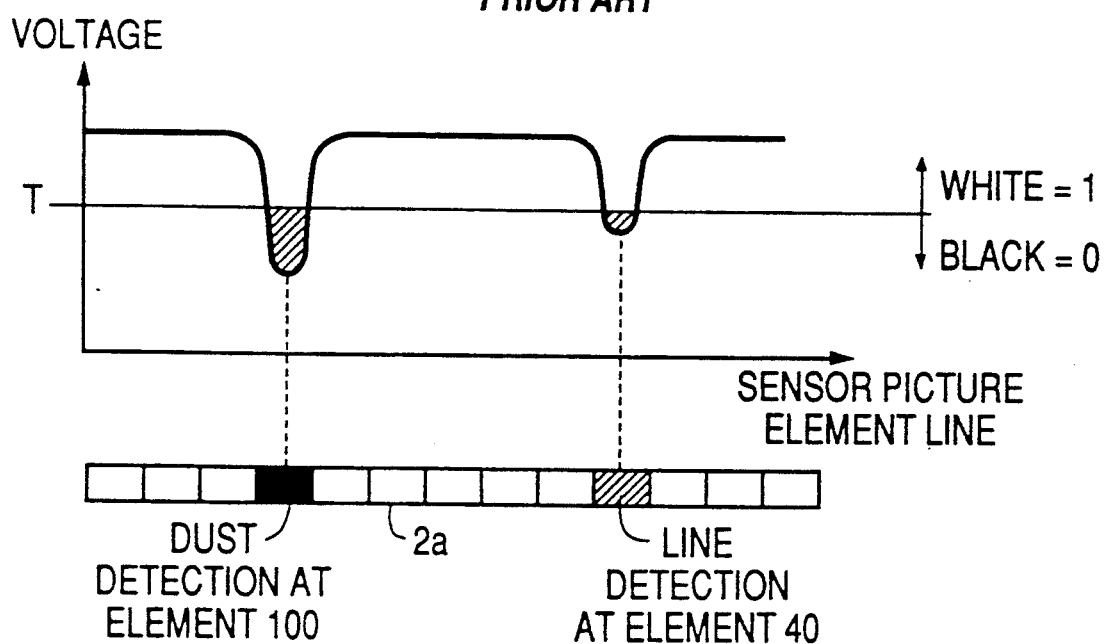
FIG. 5 is an explanatory view, similar to FIG. 2, of the prior art.

As described above, the line sensor reader 2a consists of a plurality of individual sensor elements, each of the individual sensor elements denoting a picture element or pixel. Typically, an image sensor will contain about sixteen thousand of such elements. However, to simplify the drawing, FIG. 5 depicts the sensor reader 2a of the scanner 2 as having ten sensors elements 1...10. The reading out of one line is carried out from the picture element 1 to the picture element 10 such that the scanner 2 sequentially outputs one-by-one ten picture element voltage signals in series as analog data. The series analog data output from the scanner 2 is sequentially converted into six-bit data by the A/D converter 30. That is, the picture element voltage signal from the picture element 1 of the line sensor 2a is converted into six-bit digital data, then the picture element voltage signal from the picture element 2 of the sensor 2a is converted into six-bit digital data, and so on.

Then, the digital data for each sensor element is sequentially applied to the comparators 10 and 14. The six-bit digital data denoting the sensor element voltage signal of the sensor element 1 is compared with the thresholds set and the comparators 10 and 14, and the results of the comparison (1 or 0) is applied to the input terminals SLC and THS of the combination circuit 18 as described above with reference to FIG. 1. Then, the same operation is successively carried out for each of the six-bit digital data denoting the sensor element voltage signals of the sensor elements 2...10.

For each of the respective sensor elements 1...10, the combination circuit 18 outputs binary data (1 or 0) denoting "white" or "black" based on the values (1 or 0) applied to the input terminals SLC and THS. In this manner, the serial multi-voltage analog data output from the scanner 2 is converted to serial binary data.

Incidentally, the A/D converter 30 described above generates six-bit digital data to achieve 64 gradations of the multi-value analog sensor voltages. Other gradation levels may of course be used.

The explanation above is applied to the case in which the manuscript to be read is a positive one. When the manuscript is instead negative, the truth table of the combining circuit 18 can be revised accordingly to remove dirt or dust having a density darker than that of lines drawn on the drawing.

According to the present invention, it is possible as described above to set two thresholds to determine the density range to be read, and arbitrary selection of the desired density range is enabled. Thus, dirt or dust on the manuscript may be effectively removed from the output of the scanner read image data.

I claim:

1. An apparatus comprising:
   image scanner means for scanning an image and for generating a corresponding image signal, the image signal having a signal magnitude which varies in accordance with a density of the thus scanned image; and,
   binarizing means for converting the image signal generated by said image scanner means into a binary signal representative of the image scanned by said image scanner means, said binarizing means including (a) a first comparator for comparing the signal magnitude of the image signal with a first threshold denoting a first image density, (b) a second comparator for comparing the signal magnitude of the image signal with a second threshold denoting a second image density which is greater than the firs image density, and (c) an output circuit, operatively coupled to said first and second comparators, for generating the binary signal;
   wherein the binary signal is made up of first and second values respectively denoting a presence of the scanned image and an absence of the scanned image, and wherein said output circuit includes means for generating the first value when the signal magnitude of the image signal is between the first and second thresholds, and for generating the second value when the signal magnitude of the image signal is not between the first and second thresholds, and wherein the first value denoting the presence of the scanned image is generated by said output circuit if the density of the scanned image is between the first and second densities, and the second value denoting the absence of the scanned image is generated by said output circuit if the density of the scanned image is either one of less than the first density or greater than the second density.

2. An apparatus comprising:
   an image scanner for scanning an image and including a plurality of sensor elements which generate an analog image signal having a signal magnitude which varies in accordance with a density of a scanned image, said image scanner generating a serial output image signal made up of a succession of the analog image signals generated by the respective sensor elements;
   binarizing means for converting the serial output image signal generated by said image scanner into a serial binary signal representative of the image scanner by said image scanner means, said binarizing means including (a) a first comparator for comparing the signal magnitude of each analog image signal of the serial output image signal with a first threshold denoting a first image density, (b) a second comparator for comparing the signal magnitude of each analog image signal of the serial output image signal with a second threshold denoting a second image density which is greater than the first image density, and (c) an output circuit, operatively coupled to said first and second comparators, for generating the serial binary signal;
   wherein the binary signal is made up of a succession of first and second values respectively denoting a presence of the scanned image and an absence of the scanned image, and wherein said output circuit includes means for generating for each analog image signal of the serial output image signal the first value when the signal magnitude thereof is between the first and second thresholds, and for generating the second value when the signal magnitude thereof is not between the first and second thresholds, and wherein, for each analog image signal, the first value denoting the presence of the scanned image is generated by said output circuit if the density of the scanned image is between the first and second densities, and the second value denoting the absence of the scanned image is generated by said output circuit if the density of the scanned image is either one of less than the first density or greater than the second density.

3. An apparatus comprising:

an image scanner for scanning an image and including a plurality of sensor elements which generate an analog image signal having a signal magnitude which varies in accordance with a density of a scanned image, said image scanner generating a serial analog output image signal made up of a succession of the analog image signals generated by the respective sensor elements;

digitizing means for converting the serial analog output image signal generated by said image scanner to a serial digital output image signal made up of a succession of multi-bit data denoting the signal magnitude of a respective analog image signal of the serial analog output image signal;

binarizing means for converting the serial digital output image signal generated by said image scanner into a serial binary signal representative of the image scanned by said image scanner means, said binarizing means including (a) a first comparator for comparing the signal magnitude of each multi-bit data of the serial digital output image signal with a first threshold denoting a first image density, (b) a second comparator for comparing the signal magnitude of each multi-bit data of the serial digital output image signal with a second threshold denoting a second image density which is greater than the first image density, and (c) an output circuit, operatively coupled to said first and second comparators, for generating the serial binary signal;

wherein the binary signal is made up of a succession of first and second values respectively denoting a presence of the scanned image and an absence of the scanned image, and wherein said output circuit includes means for generating for each multi-bit data of the serial digital output image signal the first value when the signal magnitude thereof is between the first and second thresholds, and for generating the second value when the signal magnitude thereof is not between the first and second thresholds, and wherein, for each multi-bit data, the first value denoting the presence of the scanned image is generated by said output circuit if the density of the scanned image is between the first and second densities, and the second value denoting the absence of the scanned image is generated by said output circuit if the density of the scanned image is either one of less than the first density or greater than the second density.

* * * * *